Jan. 23, 1945. J. W. SPISELMAN 2,367,695
CONCENTRATION OF HYGROSCOPIC SOLUTIONS
Filed Oct. 3, 1940
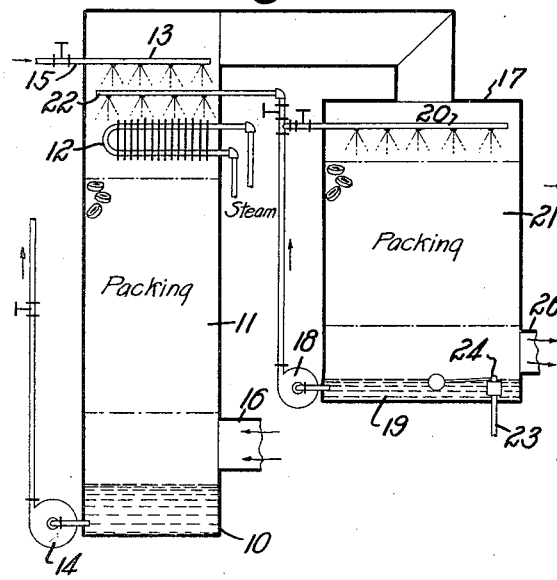
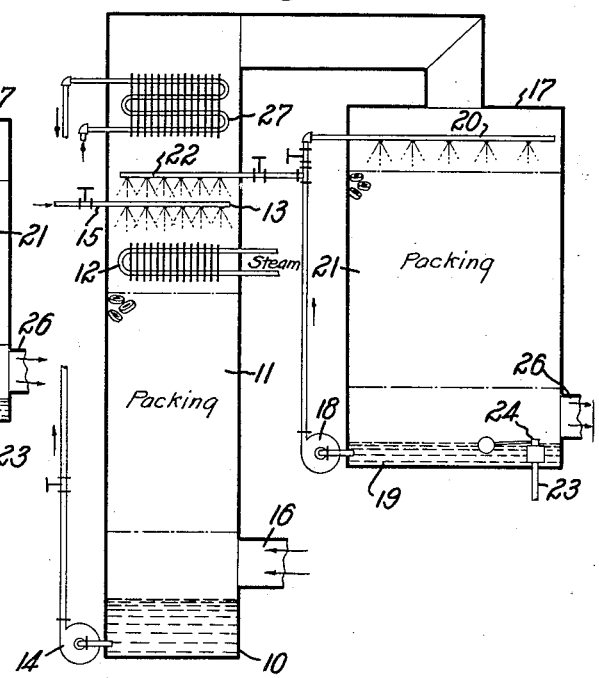
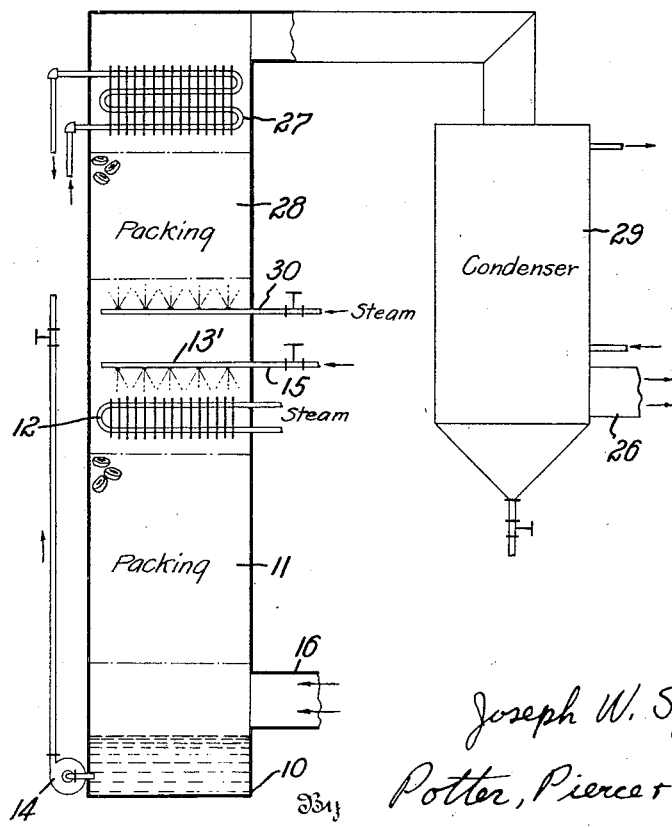
Inventor:
Joseph W. Spiselman
Potter, Pierce & Scheffler
Attorneys.

Patented Jan. 23, 1945

2,367,695

UNITED STATES PATENT OFFICE 2,367,695

CONCENTRATION OF HYGROSCOPIC SOLUTIONS

Joseph W. Spiselman, Brooklyn, N. Y., assignor to Research Corporation, New York, N. Y., a corporation of New York Application October 3, 1940, Serial No. 359,627

13 Claims. (Cl. 202—46)

This invention relates to the concentration of hygroscopic solutions and is particularly directed to method and apparatus for the efficient and economical removal of water from organic hygroscopic substance of relatively low but appreciable volatility, such as the polyhydroxy organic compounds typified by triethylene glycol.

The use of certain organic substances such as glycerol and the polyglycols as dehumidifying agents in the conditioning of air for comfort or industrial purposes has been proposed. Such substances have many advantages in such use, particularly their ease of handling, their non-corrosiveness and their substantial hygroscopicity which is readily and definitely controllable by regulation of the concentration of the aqueous solutions used for the dehumidification. However, for most purposes it is necessary to use these substances at relatively high concentrations amounting to 85% and higher, and the water absorbed from the air by the solutions must be continuously or intermittently removed from the solutions in order to maintain them at the desired strength. The concentration of the substances to the desired strengths for the dehumidification has involved economic disadvantages which have heretofore militated severely against their use. One of these disadvantages involves the high temperatures required to remove water from the solutions at the high concentrations required in dehumidifying operations. This high temperature is not only an economic disadvantage in requiring a high temperature heat source but also involves a greater possibility of decomposition of the organic hygroscopic substances. A further economic disadvantage arises out of the loss of organic hygroscopic substance because of the appreciable vapor pressures of these substances at temperatures substantially higher than room temperature.

A principal object of the invention therefore is the provision of methods and apparatus for the efficient and economical removal of water from hygroscopic organic substances, particularly polyhydroxy organic substances such as triethylene glycol.

It has been found that very efficient concentration of organic substances having hygroscopic properties adapting them for use in the dehumidification of air, can be effected by passing a current of carrier gas such as air over an extended surface of the solution to be concentrated while maintaining the solution at a relatively low temperature, for example, from 100° to 212° F. This has the advantage of permitting the use of exhaust or low pressure steam for the concentrating operation. It has been found that within this range of temperatures the ratio of the amount of water evaporated to the amount of the hygroscopic organic substance evaporated is at a maximum, the preferred temperature of evaporation within this range varying with the concentration of the hygroscopic substance and the moisture content of the carrier gas available for use in the process. Utilizing atmospheric air of the moisture content normally available at seasons when air conditioning is required, for the concentration of triethylene glycol solutions at strengths required for normal comfort or industrial air conditioning, the temperature to which the solutions are heated in the concentration operation may advantageously be from 140° to 200° F.

It has been further found that, although the small quantities of the hygroscopic substance carried by the gas stream in concentrating the solutions at these low temperatures are still too great to permit satisfactorily economic operation, substantially the entire amount of the hygroscopic substance may be removed from the gas by the dynamic saturation of the gas with water vapor at a temperature below the temperature of evaporation. This may be readily effected either by cooling the gas to below its moisture dew point, or by adding water vapor to the gas, or by a combination of both methods. It has been found that air dynamically saturated with water vapor in this manner will lose substantially its entire vapor content of high boiling organic substance, which is, so to speak, "driven" into the liquid phase.

For the purpose of illustration, the invention will be more particularly described and illustrated as applied to the concentration of hygroscopic compositions containing triethylene glycol, the properties of which have been found to render it very suitable for the dehumidification of air or other gases for comfort and for most industrial conditions.

In the accompanying drawing Figs. 1, 2 and 3 are diagrammatic representations of three different methods and apparatus embodying the principles of the invention. These methods and apparatus may form an integral part of air conditioning systems of the type illustrated in U. S. Patent No. 2,162,158 to S. C. Coey, although they are by no means limited to use as part of such systems.

In the method and apparatus illustrated in Fig. 1, the triethylene glycol is removed from the carrier gas by bringing the gas to its aqueous dew point by means of extended surface contact with water or a dilute solution of triethylene glycol.

The concentrator comprises essentially a sump 10, a packed section 11, a heating section to which heat is supplied by extended surface coil 12 and a spray device 13 for distributing solution to be concentrated over the heating coil. Diluted triethylene glycol from the dehumidifier of the air conditioning system is supplied to sprays 13 through pipe 15. From sprays 13 the solution flows over steam coil 12 where it is heated, for example, to about 185° F. and thence flows over the extended surface packing material in section 11 to the sump 10. Pump 14 serves to pump concentrated liquid from the sump 10 to the dehumidifying apparatus.

Air supplied by a fan or blower, not shown, passes into the bottom of the concentrator above the sump through inlet 16 and passes upward over the extended surface of the solution descending over heater coil 12 and packing 11. If the air enters, for example, at 95° F. dry bulb, 78° F. wet bulb, and 72° F. dew point, carrying 119 grains of water vapor per pound and the solution from sprays 13 is at a concentration of approximately 96% triethylene glycol and is heated by coil 12 to 185° F., the air will leave the coil at about 185° F. dry bulb, 110° F. wet bulb and 96° F. dew point, carrying per pound of dry air 7 grains of triethylene glycol and 262 grains of water, of which 143 were evaporated from the solution, and the liquid passing from the packing 11 into sump 10 will be at a concentration of approximately 98% triethylene glycol.

The triethylene glycol carried by the air is eliminated from the air and returned to the concentrator by saturator 17. Water, which soon becomes a dilute solution of triethylene glycol is circulated by pump 18 from sump 19 of saturator 17 to sprays 20 whence it flows over extended surface packing material 21 confluently with the air stream from the concentrator. The air stream from the concentrator may, however, be passed through the saturator 17 countercurrent to the water sprays. A properly adjusted proportion of the dilute solution from the sump 19 is continuously returned to the concentrator through sprays 22. The volume of dilute solution in the saturator is maintained constant by adding water from line 23 controlled by float control 24.

Under the conditions stated by way of example above, if the proportion of solution withdrawn from the saturator is adjusted to maintain a concentration of about 33% triethylene glycol in the saturator the air leaving the saturator at 26 will be saturated with water vapor at 110° F. and will contain 415 grains of water vapor per pound of air and substantially no triethylene glycol. Under the stated conditions about 49 pounds of air are required to eliminate one pound of water in the overall concentration operation. The make-up water supplied to sump 19 of the saturator will amount to about 170 grains per pound of air.

The form of the invention illustrated in Fig. 2 is similar to that shown in Fig. 1 except that a cooling saturator, comprising finned cooling coil 27, is interposed in the gas stream before it goes to the direct contact saturator 17. The cooling coil may be supplied with any available coolant, such as water, or the stream of diluted hygroscopic solution from the dehumidifying operation may be passed through coil 27 before going to the concentrator.

If a coolant medium at about 80° F. is supplied to coil 27, under operating conditions otherwise similar to those set forth in the description of Fig. 1, the air will typically pass to the spray saturator 17 at 98° F. dry bulb, 97° F. wet bulb, 96° F. dew point, and carrying 262 grains of water and only approximately 0.5 grain of triethylene glycol vapor per pound, the eliminated glycol dripping back into the concentrator. Because of the precooling of the air nearly to the aqueous vapor saturation point by coil 27 the burden on spray saturator 17 is greatly lessened. The air stream leaving saturator 17 at 26 will be saturated with water vapor at 97° F. and will carry about 270 grains of water per pound. In this method of operation only about 9 grains of make-up water per pound of air need be supplied to saturator 17.

The use of an extended surface saturator, as shown at 21 in Figs. 1 and 2, is particularly advantageous in providing for the effective removal of any fog-like particles of condensed material which may form upon cooling the carrier gas and which under some conditions would involve a substantial loss of hygroscopic substance unless they are recovered from the gas.

In the embodiment of the invention shown in Fig. 3, the spray saturator is eliminated entirely and the air is brought to complete aqueous vapor saturation by means of cooling coil 27. The effectiveness of the cooling coil is increased by providing an extended surface packed section 28 beneath the coil so that condensate from the coil passing down through the packed section undergoes a fractionating interchange with the vapor content of the air passing upward to the coil. As a result of this interchange the air at the top of the packed section 28, under conditions otherwise similar to those set forth in describing Fig. 1, is brought to approximately 140° F. dry bulb, 110° F. wet bulb and 105° F. dew point, for example, and by supplying coolant at 80° F. to the coil 27 the air is readily brought to complete aqueous vapor saturation at 96° F. and therefore free from triethylene glycol.

The saturated air or carrier gas from coil 27 may be exhausted to the atmosphere or it may be passed through a condenser 29 to eliminate some of its water load and recycled to the evaporator.

In case the aqueous dew point of the air leaving coil 12 is lower than the temperature of the cooling medium available for supply to coil 27, the dew point of the air may advantageously be raised to above the temperature of the available coolant by adding water vapor to the air stream at any point between sprays 13 and coil 27, for example, by means of steam inlet 30.

It will be seen that the invention provides a method and apparatus for the removal of water from hygroscopic organic substances, such as triethylene glycol, in which the water removal is effected at low temperatures whereby an economy of heating agent and an elimination of decomposition is obtained, by contacting an extended surface of the aqueous organic substance at a temperature not substantially above the normal boiling point of water with a current of gas and eliminating organic substance from the gas stream by saturating the gas stream with water vapor at a temperature below the temperature of contact.

I claim:

1. A method of concentrating aqueous solutions of hygroscopic organic substances having boiling points higher than the normal boiling point of water without substantial loss of the substance which comprises heating the solution to a temperature above 100° F. and not subtantially higher than the normal boiling point of water, contacting an extended surface stream of the heated solution with a stream of gas to transfer from said solution to the gas mixed vapors of water and organic substance whereby the solution is concentrated, separating the concentrated solution from the gas, thereafter completely saturating the gas with water vapor thereby condensing substantially all the organic substance from the gas in the form of an aqueous solution thereof, and separating the condensed aqueous solution of the organic substance from the water vapor-saturated gas.

2. A method of concentrating aqueous solutions of hygroscopic organic substances having boiling points higher than the normal boiling point of water without substantial loss of the substance which comprises heating the solution to a temperature above 100° F. and not substantially higher than the normal boiling point of water, contacting an extended surface stream of the heated solution with a stream of gas to transfer from said solution to the gas mixed vapors of water and organic substance whereby the solution is concentrated, separating the concentrated solution from the gas, thereafter cooling the gas to a temperature at which it is completely saturated with water vapor thereby condensing substantially all the organic substance from the gas in the form of an aqueous solution thereof, and separating the condensed aqueous solution of the organic substance from the water vapor-saturated gas.

3. A method of concentrating aqueous solutions of hygroscopic organic substances having boiling points higher than the normal boiling point of water without substantial loss of the substance which comprises heating the solution to a temperature above 100° F. and not substantially higher than the normal boiling point of water, contacting an extended surface stream of the heated solution with a stream of gas to transfer from said solution to the gas mixed vapors of water and organic substance whereby the solution is concentrated, separating the concentrated solution from the gas, thereafter condensing vaporized organic substance from the gas by completely saturating the gas with water vapor by direct contact with a recirculating stream of water containing said condensed organic substance and returning a portion of said stream of water and condensed organic substance to the solution being concentrated.

4. A method of concentrating aqueous solutions of hygroscopic organic substances having boiling points higher than the normal boiling point of water without substantial loss of the substance which comprises heating the solution to a temperature above 100° F. and not substantially higher than the normal boiling point of water, contacting an extended surface stream of the heated solution with a stream of gas to transfer from said solution to the gas mixed vapors of water and organic substance whereby the solution is concentrated, separating the concentrated solution from the gas, thereafter cooling the gas to a temperature between the highest temperature of contact with said solution and the temperature at which it is saturated with water vapor, then condensing vaporized organic substance from the gas by completely saturating the gas with water vapor by direct contact with a recirculating stream of water containing said condensed organic substance and returning a portion of said stream of water and condensed organic substance to the solution being concentrated.

5. A method of concentrating aqueous solutions of hygroscopic organic substances having boiling points higher than the normal boiling point of water without substantial loss of the substance which comprises heating the solution to a temperature above 100° F. and not substantially higher than the normal boiling point of water, contacting an extended surface stream of the heated solution with a stream of gas to transfer from said solution to the gas mixed vapors of water and organic substance whereby the solution is concentrated, separating the concentrated solution from the gas, thereafter completely saturating the gas with water vapor thereby condensing substantially all the organic substance from the gas in the form of an aqueous solution thereof, separating the condensed aqueous solution of the organic substance from the water vapor-saturated gas, and passing the condensed aqueous solution of the organic substance into countercurrent contact with the stream of gas intermediate the zone of contact of the gas with the solution being concentrated and the zone of saturation of the gas with water vapor.

6. A method of concentrating aqueous solutions of triethylene glycol without substantial loss thereof, which comprises heating the solution to a temperature above about 100° F. and not substantially higher than the normal boiling point of water, contacting an extended surface stream of the heated solution with a stream of gas to transfer from said solution to the gas mixed vapors of water and triethylene glycol whereby the solution is concentrated, separating the concentrated solution from the gas, thereafter completely saturating the gas with water vapor thereby condensing substantially all the triethylene glycol from the gas in the form of an aqueous solution thereof, and separating the condensed aqueous solution of the triethylene glycol from the water vapor-saturated gas.

7. A method of concentrating aqueous solutions of triethylene glycol without substantial loss thereof, which comprises heating the solution to a temperature above about 100° F. and not substantially higher than the normal boiling point of water, contacting an extended surface stream of the heated solution with a stream of gas to transfer from said solution to the gas mixed vapors of water and triethylene glycol whereby the solution is concentrated, separating the concentrated solution from the gas, thereafter cooling the gas to a temperature at which it is completely saturated with water vapor thereby condensing substantially all the triethylene glycol from the gas in the form of an aqueous solution thereof, and separating the condensed aqueous solution of the triethylene glycol from the water vapor-saturated gas.

8. A method of concentrating aqueous solutions of triethylene glycol without substantial loss thereof, which comprises heating the solution to a temperature above about 100° F. and not substantially higher than the normal boiling point of water, contacting an extended surface stream of the heated solution with a stream of gas to transfer from said solution to the gas mixed vapors of water and triethylene glycol whereby the solution is concentrated, separating the concentrated solution from the gas, thereafter condensing vaporized triethylene glycol from the gas by completely saturating the gas with water vapor by direct contact with a recirculating stream of water containing triethylene glycol and returning a portion of said stream of water and triethylene glycol to the solution being concentrated.

9. A method of concentrating aqueous solutions of triethylene glycol without substantial loss thereof, which comprises heating the solution to a temperature above about 100° F. and not substantially higher than the normal boiling point of water, contacting an extended surface stream of the heated solution with a stream of gas to transfer from said solution to the gas mixed vapors of water and triethylene glycol whereby the solution is concentrated, separating the concentrated solution from the gas, thereafter cooling the gas to a temperature between the highest temperature of contact with said solution and the temperature at which it is saturated with water vapor, then condensing vaporizing triethylene glycol from the gas by completely saturating the gas with water vapor by direct contact with a recirculating stream of water containing triethylene glycol and returning a portion of said stream of water and triethylene glycol to the solution being concentrated.

10. A method of concentrating aqueous solutions of triethylene glycol without substantial loss thereof, which comprises heating the solution to a temperature above about 100° F. and not substantially higher than the normal boiling point of water, contacting an extended surface stream of the heated solution with a stream of gas to transfer from said solution to the gas mixed vapors of water and triethylene glycol whereby the solution is concentrated, separating the concentrated solution from the gas, thereafter completely saturating the gas with water vapor thereby condensing substantially all the triethylene glycol from the gas in the form of an aqueous solution thereof, separating the condensed aqueous solution of the triethylene glycol from the water vapor-saturated gas, and passing the condensed aqueous solution of triethylene glycol into counter-current contact with the stream of gas intermediate the zone of contact of the gas with the solution being concentrated and the zone of saturation of the gas with water vapor.

11. A method of concentrating aqueous solutions of hygroscopic organic substances having boiling points higher than the normal boiling point of water without substantial loss of the substance which comprises contacting an extended surface stream of the solution at a temperature above 100° F. with a stream of gas to transfer from said solution to the gas mixed vapors of water and organic substance whereby the solution is concentrated, separating the concentrated solution from the gas, thereafter completely saturating the gas with water vapor thereby condensing substantially all the organic substance from the gas in the form of an aqueous solution thereof, and separating the condensed aqueous solution from the water-vapor saturated gas.

12. A method of concentrating aqueous solutions of hygroscopic organic substances having boiling points higher than the normal boiling point of water without substantial loss of the substance which comprises contacting an extended surface stream of the solution at a temperature above 100° F. with a stream of gas to transfer from said solution to the gas mixed vapors of water and organic substance whereby the solution is concentrated, separating the concentrated solution from the gas, thereafter indirectly cooling the gas to a temperature at which it is completely saturated with water vapor thereby condensing substantially all the organic substance from the gas in the form of an aqueous solution thereof, and separating the condensed aqueous solution form the water-vapor saturated gas.

13. A method of concentrating aqueous solutions of hygroscopic organic substances having boiling points higher than the normal boiling point of water without substantial loss of the substance which comprises contacting an extended surface stream of the solution at a temperature above 100° F. with a stream of gas to transfer from said solution to the gas mixed vapors of water and organic substance whereby the solution is concentrated, separating the concentrated solution from the gas, thereafter cooling the gas to a temperature at which it is completely saturated with water vapor by contacting the gas with an extended surface stream of water thereby condensing substantially all the organic substance from the gas in the form of an aqueous solution thereof, and separating the condensed aqueous solution from the water-vapor saturated gas.

JOSEPH W. SPISELMAN.